US008670384B2

(12) United States Patent
Lindoff et al.

(10) Patent No.: US 8,670,384 B2
(45) Date of Patent: *Mar. 11, 2014

(54) CELL SEARCHING SYSTEM AND METHOD (75) Inventors: Bengt Lindoff, Bjärred (SE); Robert Baldemair, Solna (SE); Erik Dahlman, Bromma (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/158,895

(22) Filed: Jun. 13, 2011

(65) Prior Publication Data

US 2011/0244850 A1 Oct. 6, 2011

Related U.S. Application Data (63) Continuation of application No. 11/852,606, filed on Sep. 10, 2007, now Pat. No. 8,009,661.

(60) Provisional application No. 60/887,456, filed on Jan. 31, 2007.

(51) Int. Cl.
*H04W 4/00* (2009.01)
*H04J 3/06* (2006.01)
*H04W 72/00* (2009.01)

(52) U.S. Cl.
USPC .................. 370/328; 370/350; 455/450

(58) Field of Classification Search
None
See application file for complete search history.

(56) References Cited

U.S. PATENT DOCUMENTS

| 6,185,244 | B1 | 2/2001 | Nystrom et al. |
| 6,894,995 | B2 | 5/2005 | Chitrapu et al. |
| 7,065,064 | B2 | 6/2006 | Chitrapu |
| 7,158,505 | B2 | 1/2007 | Dick et al. |
| 7,292,548 | B2 * | 11/2007 | Lim et al. ............... 370/328 |

(Continued)

FOREIGN PATENT DOCUMENTS

| EP | 1147851 | 10/2001 |
| EP | 1391999 | 2/2004 |
| GB | 2351422 A | 12/2000 |
| WO | 0065736 | 11/2000 |

OTHER PUBLICATIONS

R1-062990. TSG-RAN WG1 #46bis. Seoul, Korea. Oct. 9-13, 2006. Available at: http://www.3gpp.org/ftp/tsg_ran/WG1_RL1/TSGR1_46bis/Docs/.

(Continued)

*Primary Examiner* — Marcus R Smith
(74) *Attorney, Agent, or Firm* — Coats and Bennett PLLC (57) ABSTRACT

For wireless networks that transmit synchronization signals allowing user equipment to synchronize to cells within the network and transmit reference signals allowing user equipment to determine cell identities, a method and apparatus taught herein advantageously link the synchronization signal sequences to the reference signal sequences according to a defined mapping. The linking simplifies the cell search process by allowing user equipment to determine cell identities based on mapping detected synchronization signal sequences to the corresponding reference signal or to the corresponding subset of reference signals in embodiments where there are more reference signal sequences than synchronization signal sequences. In at least one embodiment, the network is a 3G LTE network and at least the Primary Synchronization Signal (P-SyS) sequences are linked to the Downlink (DL) reference symbol sequences according to a defined mapping, thereby allowing to user equipment to determine cell identities from detected P-SyS sequences.

11 Claims, 5 Drawing Sheets

(56) References Cited

U.S. PATENT DOCUMENTS

| | | | |
|---|---|---|---|
| 7,751,308 B2* | 7/2010 | Feng et al. | 370/208 |
| 2002/0097705 A1 | 7/2002 | Sezgin et al. | |
| 2002/0196875 A1 | 12/2002 | Palenius | |
| 2004/0085946 A1* | 5/2004 | Morita et al. | 370/342 |
| 2004/0246998 A1* | 12/2004 | Ma et al. | 370/527 |
| 2005/0002376 A1 | 1/2005 | Rimi et al. | |
| 2005/0043049 A1 | 2/2005 | Demir et al. | |
| 2006/0268808 A1 | 11/2006 | Kang | |
| 2007/0066298 A1 | 3/2007 | Hurst | |
| 2007/0140106 A1* | 6/2007 | Tsai et al. | 370/208 |
| 2008/0019350 A1* | 1/2008 | Onggosanusi et al. | 370/350 |
| 2009/0135803 A1 | 5/2009 | Luo et al. | |

OTHER PUBLICATIONS

R1-062495. TSG RAN WG1 #46BIS. Seoul, Korea. Oct. 9-13, 2006. Available at: http://www.3gpp.org/ftp/tsg_ran/WG1_RL1/TSGR1_46bis/Docs/.

R1-062518. TSG RAN WG1 #46bis. Seoul, Korea. Oct. 9-13, 2006. Available at: http://www.3gpp.org/ftp/tsg_ran/WG1_RL1/TSGR1_46bis/Docs/.

R1-062560. TSG RAN WG1 #46bis. Seoul, Korea. Oct. 9-13, 2006. Available at: http://www.3gpp.org/ftp/tsg_ran/WG1_RL1/TSGR1_46bis/Docs/.

R1-062582. 3GPP TSG RAN1. Seoul, Korea. Sep. 9-13, 2006. Available at: http://www.3gpp.org/ftp/tsg_ran/WG1_RL1/TSGR1_46bis/Docs/.

R1-062605. 3GPP TSG RAN1 #46bis. Seoul, Korea. Oct. 9-13, 2006. Available at: http://www.3gpp.org/ftp/tsg_ran/WG1_RL1/TSGR1_46bis/Docs/.

R1-062636. 3GPP TSG RAN WG1 46bis. Seoul, Korea. Oct. 9-13, 2006. Available at: http://www.3gpp.org/ftp/tsg_ran/WG1_RL1/TSGR1_46bis/Docs/.

R1-062637. 3GPP TSG RAN WG1 46bis. Seoul, Korea. Oct. 9-13, 2006. Available at: http://www.3gpp.org/ftp/tsg_ran/WG1_RL1/TSGR1_46bis/Docs/.

R1-062638. 3GPP TSG RAN WG1 46bis. Seoul, Korea. Oct. 9-13, 2006. Available at: http://www.3gpp.org/ftp/tsg_ran/WG1_RL1/TSGR1_46bis/Docs/.

R1-062639. 3GPP TSG RAN WG1#46bis. Seoul, Korea. Oct. 9-13, 2006. Available at: http://www.3gpp.org/ftp/tsg_ran/WG1_RL1/TSGR1_46bis/Docs/.

R1-062691. 3GPP TSG-RAN WG1 #46bis. Seoul, Korea. Oct. 9-13, 2006. Available at: http://www.3gpp.org/ftp/tsg_ran/WG1_RL1/TSGR1_46bis/Docs/.

R1-062722. 3GPP TSG RAN WG1 Meeting #46bis. Seoul, Korea. Oct. 9-13, 2006. Available at: http://www.3gpp.org/ftp/tsg_ran/WG1_RL1/TSGR1_46bis/Docs/.

R1-062744. 3GPP TSG-RAN WG1 #46bis. Seoul, Korea. Oct. 9-13, 2006. Available at: http://www.3gpp.org/ftp/tsg_ran/WG1_RL1/TSGR1_46bis/Docs/.

R1-062767. 3GPP TSG RAN WG1 Meeting #46bis. Seoul, Korea. Oct. 9-13, 2006. Available at: http://www.3gpp.org/ftp/tsg_ran/WG1_RL1/TSGR1_46bis/Docs/.

R1-062783. 3GPP TSG RAN WG1 Meeting #46bis. Seoul, Korea. Oct. 9-13, 2006. Available at: http://www.3gpp.org/ftp/tsg_ran/WG1_RL1/TSGR1_46bis/Docs/.

R1-062844. 3GPP TSG RAN WG1 Meeting #46bis. Seoul, Korea. Oct. 8-13, 2006. Available at: http://www.3gpp.org/ftp/tsg_ran/WG1_RL1/TSGR1_46bis/Docs/.

R1-062635. 3GPP TSG RAN WG1 46bis. Seoul, Korea. Oct. 9-13, 2006. Available at: http://www.3gpp.org/ftp/tsg_ran/WG1_RL1/TSGR1_46bis/Docs/.

R1-062631. 3GPP TSG RAN WG1 47. Riga, Latavia. Nov. 6-10, 2006. Available at: http://www.3gpp.org/ftp/tsg_ran/WG1_RL1/TSGR1_47/Docs/.

R1-063032. TSG RAN WG1 meeting #47. Riga, Latavia. Nov. 6-10, 2006. Available at: http://www.3gpp.org/ftp/tsg_ran/WG1_RL1/TSGR1_47/Docs/.

R1-070650. 3GPP TSG-RAN WG1 #48. St. Louis, Missouri, US. Feb. 12-16, 2007. Available at: http://www.3gpp.org/ftp/tsg_ran/WG1_RL1/TSGR1_48/Docs/.

R1-070822. 3GPP TSG-RAN WG1 #48. St. Louis, Missouri, US. Feb. 12-16, 2007. Available at: http://www.3gpp.org/ftp/tsg_ran/WG1_RL1/TSGR1_48/Docs/.

3GPP TS 36.211 V1.0.0 (Mar. 2007). 3rd Generation Partnership Project; Technical Specification Group Radio Access Network; Physical Channels and Modulation (Release 8).

R1-062607. 3GPP TSG RAN1 #46bis. Seoul, Korea. Oct. 9-13, 2006. Available at: http://www.3gpp.org/ftp/tsg_ran/WG1_RL1/TSGR1_46bis/Docs/.

* cited by examiner

CELL SEARCHING SYSTEM AND METHOD

RELATED APPLICATIONS

This application is a continuation of U.S. patent application Ser. No. 11/852,606, filed Sep. 10, 2007, which claimed priority from U.S. Provisional Patent Application Ser. No. 60/887,456 filed on Jan. 31, 2007, and this application claims priority to both such applications, and both priority applications are expressly incorporated in their entirety by reference herein.

BACKGROUND

1. Technical Field

The present invention generally relates to wireless communication networks, and particularly relates to a method and system for determining cell identification in a multi-cell network.

2. Background

In comparison to existing wireless communication networks, such as those based on GSM and current iterations of Wideband CDMA (WCDMA), developing and planned wireless communication networks will offer comparatively high data rates through the use of increasingly sophisticated air interfaces. These changes include the likely adoption of newer transmission techniques, such as Orthogonal Frequency Division Multiplexing (OFDM), which already finds use, for example, in the 802.11 Wireless LAN standards.

One particular proposal represents an extension of the Universal Mobile Telecommunications System (UMTS) and is specified in "Release 8" of the Third Generation Partnership Project (3GPP). The Release 8 proposal is referred to as Long Term Evolution ("LTE"), and is also referred to as "Evolved UTRA" (Universal Terrestrial Radio Access) and "Evolved UTRAN" (Universal Terrestrial Radio Access Network).

LTE can be seen as an evolution of the 3G WCDMA standard, although LTE systems will use OFDM as a multiple access technique (referred to as "OFDMA") in the downlink and will be able to operate on bandwidths ranging from 1.25 MHz to 20 MHz. Furthermore, LTE will support data rates up to 100 Mb/s, at least for the largest bandwidth allocations. Additionally, not only high rate services are expected to use LTE, but also low rate services like voice.

Mobility management represents an important aspect of LTE. As user equipment (UE) moves within an LTE coverage area for example, the use of synchronization signal transmissions and cell search procedures provide a basis for the UE to detect and synchronize with individual cells. More generally, to communicate with a particular cell, UEs must be able to determine one or more transmission parameters used by the cell. Such information is obtained by decoding the cell's Broadcast Channel (BCH) signal, which in turn first requires the UE to synchronize to the cell's symbol and radio timing, and determine the cell's identifier (cell ID).

To that end, each cell transmits a Primary Synchronization Signal (P-SyS) and Secondary Synchronization Signal (S-SyS) on a per 5 ms basis. These signals allow the UE to synchronize to the symbol/frame timing of any given cell's transmissions, and thereby receive the cell's reference signal, from which the UE detects the cell's reference symbol sequence and thereby obtains the cell ID. More particularly, the P-SyS, which is based on Zadhoff-Chu sequences, is used for channel estimation by the UE and the channel estimates are then used for decoding the S-SyS, which provides frame boundary synchronization and cell group information.

Cell synchronization enabled by the P-SyS and S-SyS thus allows the UE to acquire the cell's reference symbol sequence, which identifies the cell. Reference symbol sequence generation relies on the formation of symbol-by-symbol products of one of three orthogonal sequences and one of 170 pseudorandom sequences. That arrangement yields 510 unique reference symbol sequences, thus providing for 510 unique cell identifications.

The document R1-062990 (2006) produced by TSG-RAN WG1 #46bis outlines a basic cell search procedure for UEs operating in an LTE network where good channel estimation is important for successful reference symbol sequence reception. The proposed cell search proposal involves four basic steps. First, the UE identifies a 5 ms synchronization timing from the P-SyS transmissions. For example, the UE determines a 5 ms synchronization timing for the strongest of one or more received P-SyS signals.

Second, the UE determines radio timing from the S-SyS associated with the (still unidentified) cell of interest offering the best P-SyS. Here, determining radio timing denotes the determination of the full 10 ms frame synchronization, remembering that S-SyS yields frame boundary timing, which allows the UE to synchronize with the frame timing of the cell of interest.

The proposed processing continues with using the cell-group scrambling code, determined from the S-SyS, to determine the reference symbol sequences being transmitted by the cells in the group. That determination allows the UE to determine cell ID for decoding the BCH from the cell of interest. More particularly, the UE estimates the channel transfer functions or impulse responses based on P-SyS and/or S-SyS; uses channel estimates to mitigate the impact of the propagation channels on the received signal; removes the scrambling code effects; and correlates with all possible reference symbol sequences to identify the sequence (and thus cell ID) that delivers the maximum correlation peak.

Problematically, however, without further narrowing information, the search space associated with determination of the reference symbol sequences is undesirably large—i.e., an undesirable number of hypotheses are involved in the correlation processing for reference symbol sequence identification. Additionally, reference symbol sequence determination in this context is compromised by channel estimation inaccuracies.

SUMMARY

For a wireless network, e.g., an LTE network that transmits synchronization signals allowing user equipment to synchronize to cells within the network, and transmits reference signals allowing user equipment to determine cell identities, a method and apparatus taught herein advantageously link the synchronization signal sequences to the reference signal sequences according to a defined mapping. The linking simplifies the cell search process by allowing user equipment to determine cell identities based on mapping a detected synchronization signal sequence to the corresponding reference signal or to the corresponding subset of reference signals in embodiments where there are more reference signal sequences than synchronization signal sequences. In this latter case, the mapping facilitates the cell searching process by defining a reduced search space for the determination of cell identity based on reference signal sequence detection.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
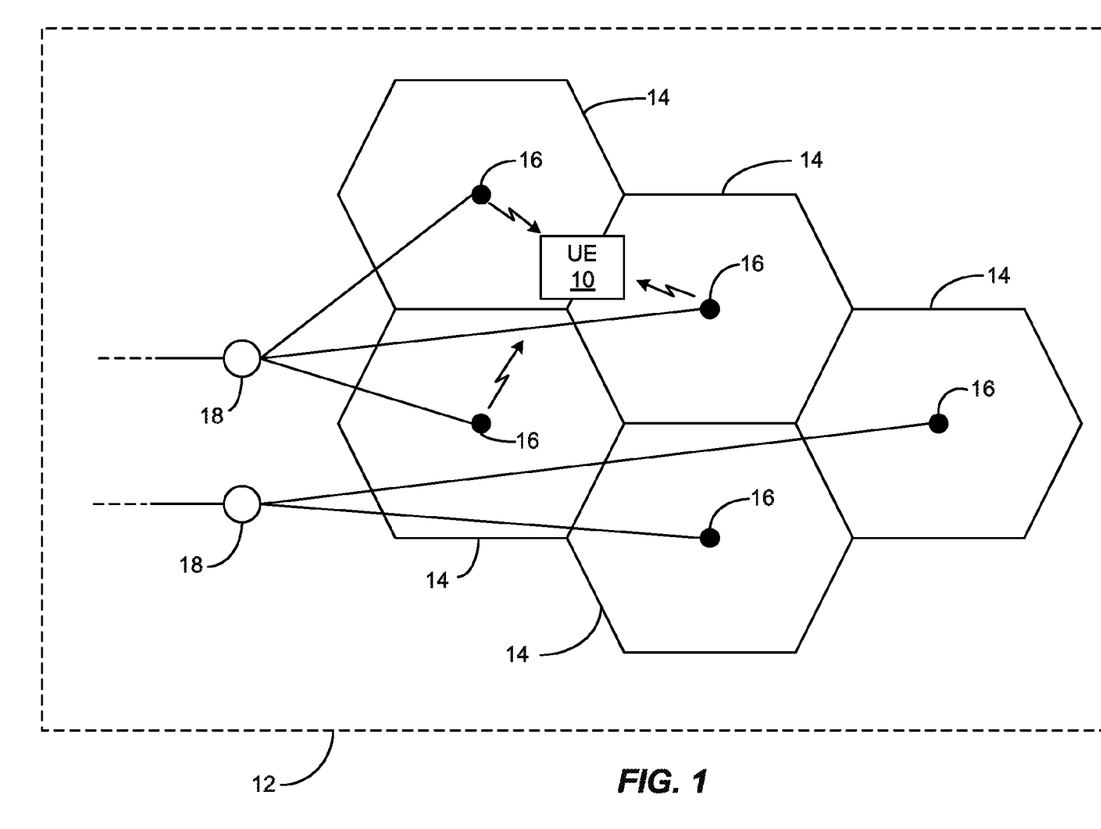
FIG. 1 is a partial block diagram of one embodiment of a wireless communication network and a user equipment (UE).

FIG. 1 is a diagram of a user equipment (UE) 10 operating in a wireless communication network 12 providing (radio) coverage via a plurality of cells 14, wherein each cell 14 transmits a synchronization signal for allowing the UE 10 to synchronize with the cell's transmission timing and transmits a reference signal for allowing the UE 10 to determine the cell's identity. Each cell 14 (or sector) of the network 12 includes one or more transmitters for transmitting the synchronization and reference signals. For example, each cell 14 may include or otherwise be associated with a radio base station 16 (also referred to as a "Node B" in some network standards), which in turn may be associated with a base station controller 18 (also referred to as a "Radio Network Controller" or "RNC" in some network standards).

Regardless of nomenclature details, the network 12 is advantageously configured to operate according to a defined linking between synchronization signal sequences and reference signal sequences, to facilitate cell searching by the UE 10. More particularly, the synchronization signal sequences relate to (or are otherwise indexed in relation to) respective ones of the reference signal sequences according to a defined mapping.

The UE 10 thus efficiently determines cell identity based on the mapping. Conventionally, cell ID is determined from the reference symbols received from the cell. Receiving those reference symbols first required using the cell's P-SyS to obtain 5 ms timing, and using the cell's S-SyS to obtain frame timing and cell group information. That information then allowed reception and decoding of the reference signal, from which the cell ID was obtained. With the mapping-based approach taught herein for at least one embodiment, the UE 10 uses the P-SyS to obtain 5 ms timing and cell identity within the cell group, and obtains frame timing and cell group information from the S-SyS. Thus, the P-SyS and S-SyS together map to the unique cell ID. Of course, the UE 10 still may use the cell's reference signal, such as to verify the cell ID determined from the synchronization signals and the mapping information.

Figure 2:
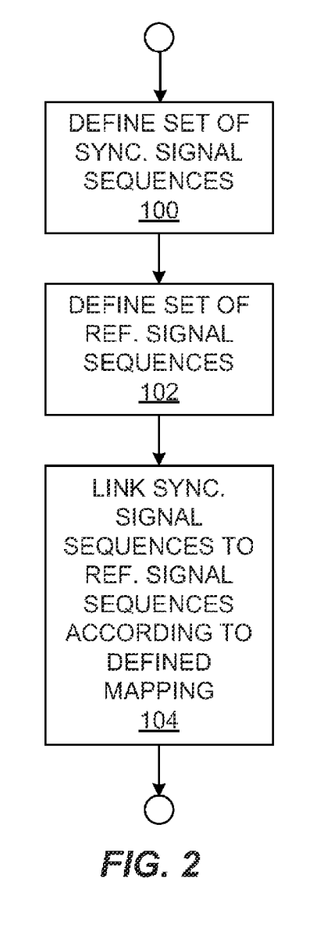
FIG. 2 is a logic flow diagram of one embodiment of a method of linking synchronization signal sequences to reference signal sequences for facilitating cell searching by UEs.

FIG. 2 illustrates one embodiment of a method of facilitating the cell search process within the network 12. The method comprises defining a set of synchronization signal sequences to be used for generating individual ones of the synchronization signals (Step 100), and defining a set of reference signal sequences to be used for generating individual ones of the reference signals (Step 102). The method continues with linking the synchronization signal sequences to the reference signal sequences according to a defined mapping to thereby enable user equipment—e.g., UE 10—to determine cell identities based on mapping detected synchronization signal sequences to corresponding reference signal sequences according to the defined mapping (Step 104).

In the above method context, "defining" the sets of synchronization signal and reference signal sequences may simply comprise storing or otherwise maintaining information for all or part of a set of codes, or for several sets of codes. By way of non-limiting examples, such code sets may comprise orthogonal codes, pseudorandom codes, or mixes thereof. In any case, members in the set of synchronization signal sequences map to members in the set of reference signal sequences.

In at least one embodiment, the UE 10 is configured to operate in LTE networks configured according to the 3GPP standards. In such embodiments, each cell transmits a Primary Synchronization Signal (P-SyS) and a Secondary Synchronization Signal (S-SyS). The P-SyS sequences used by the network 12 are mapped to reference signal sequences, thus allowing UEs with knowledge of the mapping to determine cell identities based on received P-SySs and their knowledge of the mapping. Alternatively, the mapping is based on combinations of P-SyS and S-SyS sequences—e.g., a given combination of P-SyS and S-SyS sequences maps to a given reference signal sequence. In such embodiments, the UE 10 determines a cell's ID based on receiving that cell's P-SyS and S-SyS and the UE's knowledge of the mapping.

Broadly, the mapping between synchronization signal sequences and reference signal sequences may comprise a one-to-one mapping, where there are like numbers of synchronization signal sequences and reference signal sequences; a many-to-one mapping wherein, for at least one reference signal sequence, more than one synchronization signal sequence maps to the same reference signal sequence; or a one-to-many mapping, wherein, for at least one synchronization signal sequence, more than one reference signal sequence maps to the same synchronization signal sequence.

Figure 3:
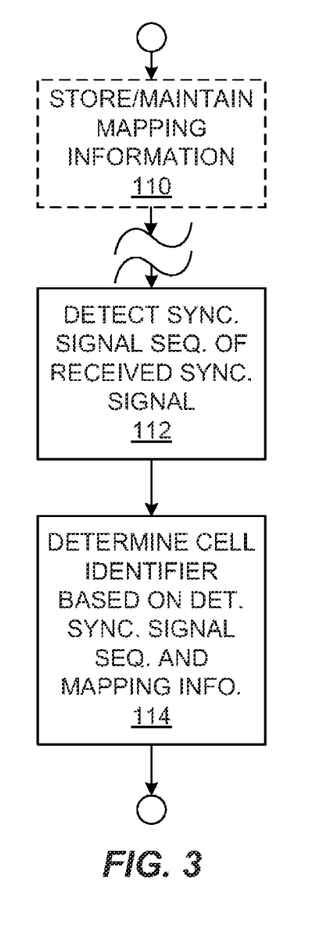
FIG. 3 is a logic flow diagram of one embodiment of a method of cell searching by a UE based on knowledge of the linking between synchronization signal sequences and reference signal sequences.

With the above method of linking in mind, FIG. 3 illustrates a complementary method of cell searching that is enhanced by the UE's knowledge of synchronization signal sequence to reference signal sequence mapping. The illustrated UE processing may be implemented at the UE 10, for example, by appropriate configuration of one or more processing circuit(s). As such, the illustrated processing may be implemented in hardware, software (e.g., as a computer program stored in a computer readable medium), or any combination thereof.

Processing "begins" with the UE 10 storing mapping information (Step 110). In this context, and for at least one embodiment, "storing" may be understood as holding or otherwise maintaining data in memory (e.g., non-volatile memory) for mapping information about the linking between synchronization signal sequences and reference signal sequences. In one or more embodiments, the mapping information is included in the UE 10 as part of a provisioning or configuration process, and thus is not carried out on a dynamic basis. In other embodiments, the mapping information is signaled to the UE 10, e.g., by the network 12, and the UE 10 may receive updated mapping information as needed.

As for the dynamic or ongoing elements of the illustrated cell searching method, the UE 10 detects the synchronization signal sequence of a received synchronization signal (Step 112), and uses the detected synchronization signal sequence to determine the cell identifier for the cell 14 associated with the received synchronization signal (Step 114). More particularly, the UE 10 determines the cell identifier by mapping the detected synchronization signal sequence to a reference signal sequence based on the stored mapping information.

Figure 4:
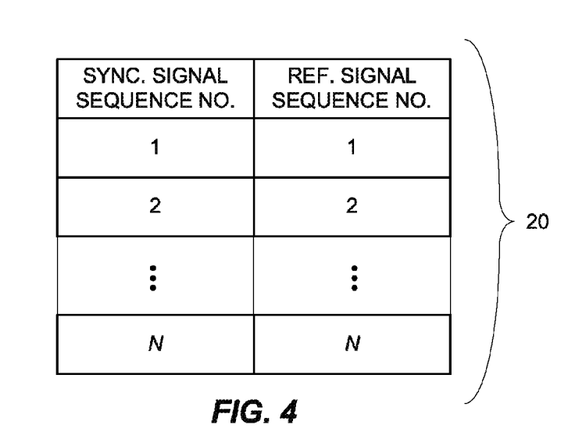
FIGS. 4-6 are tables illustrating different embodiments of mappings between synchronization signal sequences and reference signal sequences, such as can be implemented in a stored data structure.

FIG. 4 illustrates one example of a data structure 20 (e.g., a table in memory) embodying one possible mapping. More particularly, FIG. 4 illustrates a one-to-one mapping scenario based on defining as many synchronization signal sequences as reference signal sequences, such that linking the synchronization signal sequences to the reference signal sequences according to a defined mapping comprises adopting a one-to-one mapping between synchronization signal sequences and reference signal sequences. With this arrangement, detecting the synchronization signal sequence of a received synchronization signal identifies the cell originating that signal, as each synchronization signal sequence uniquely corresponds to one reference signal sequence.

Figure 5:
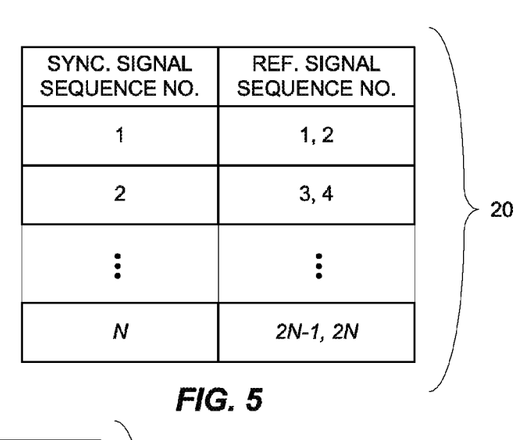

FIG. 5 illustrates another possible mapping, wherein defining a set of synchronization signal sequences to be used for generating individual ones of the synchronization signals comprises defining fewer synchronization signal sequences than reference signal sequences. Viewed alternatively, there are more reference signal sequences than synchronization signal sequences. In this case, linking the synchronization signal sequences to the reference signal sequences according to a defined mapping comprises, for one or more of the synchronization signal sequences, mapping more than one reference signal sequences to the same synchronization signal sequence. With this arrangement, detecting the synchronization signal sequence of a received synchronization signal by itself does not identify the cell originating that signal. However, the mapping advantageously limits the search space used for reference signal detection (resulting in cell identification) to the particular subset of reference signal sequences identified by the mapping.

Figure 6:
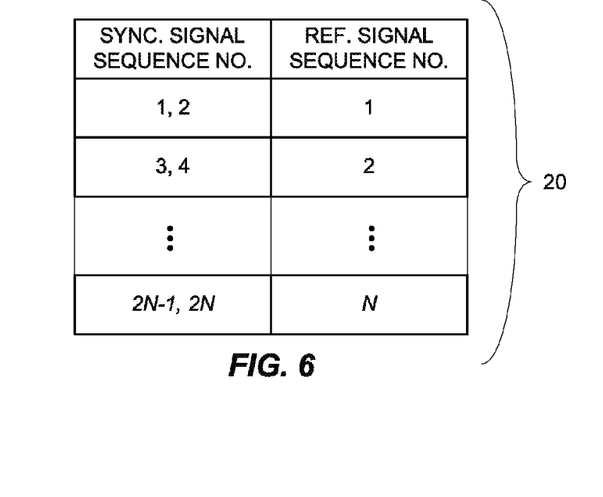

FIG. 6 illustrates another possible mapping, wherein defining a set of synchronization signal sequences to be used for generating individual ones of the synchronization signals comprises defining more synchronization signal sequences than reference signal sequences. In this case, linking the synchronization signal sequences to the reference signal sequences according to a defined mapping comprises, for one or more of the reference signal sequences, mapping more than one synchronization signal sequence to the same reference signal sequence. Again, detecting the particular synchronization signal sequence of a received synchronization signal allows the UE 10 to use the stored mapping information to uniquely identify a corresponding single reference signal sequence.

Figure 7:
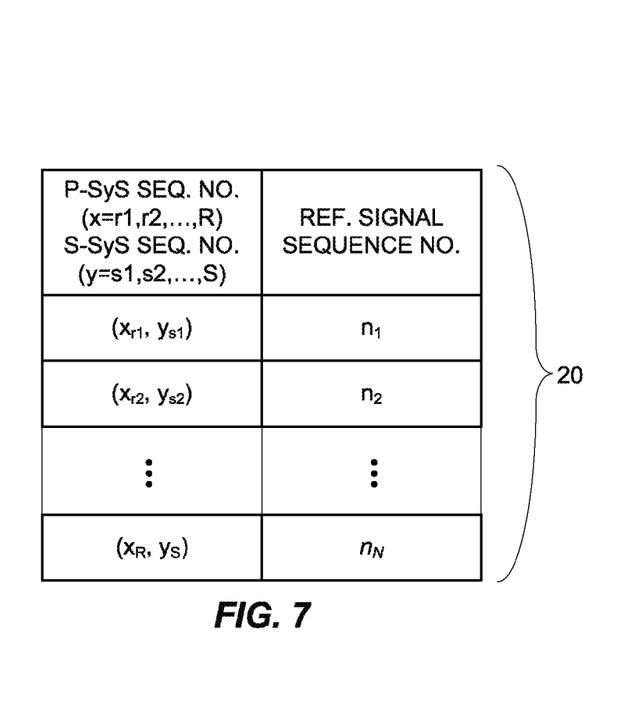
FIG. 7 is a table illustrating an embodiment of mapping combinations of synchronization signal sequences to reference signal sequences.
Figure 8:
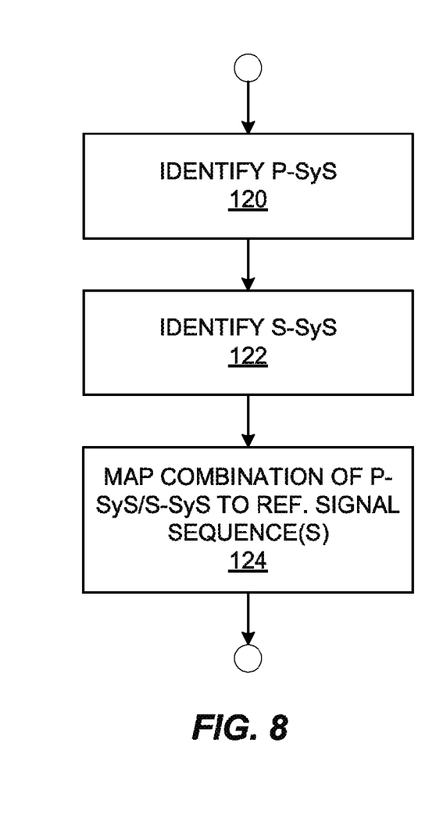
FIG. 8 is a logic flow diagram illustrating one embodiment of processing logic for mapping combinations of synchronization signal sequences to reference signal sequences.

FIG. 7 illustrates yet another possible mapping, which maps combinations of synchronization signal sequences— e.g., combinations of P-SyS and S-SyS sequences—to reference signal sequences for cell identification. Correspondingly, FIG. 8 illustrates a non-limiting example of processing logic for mapping P-SyS/S-SyS combinations to individual reference signal sequences, or to groups of reference signal sequences. Such processing includes identifying, for a given cell, the received P-SyS sequence (one of R possible sequences) (Block 120), identifying the received S-SyS sequence (one of S possible sequences) (Block 122), and mapping the combination of P-Sys/S-Sys sequences to the corresponding reference signal sequence(s), as defined by the stored mapping information (Block 124).

For example, let S=170 (s=1, 2, . . . , 170), corresponding to 170 cell group identifiers, and let R=3 (r=1, 2, 3) corresponding to three cell identifiers. Note that these cell identifiers are not unique, but rather repeat across the cell groups. With this approach, the combination of P-SyS/S-SyS sequences can be mapped directly to reference signal sequences, which in turn provide specific cell identifications. That is, the UE 10 may obtain a value for "r" as 1, 2, or 3, from a given cell's P-SyS, and then obtain a value for "s" from that same cell's S-SyS, e.g., a particular value within the range of 1 to 170. This combination of r/s may then map according to mapping information stored in the UE 10 to a unique reference symbol sequence that uniquely identifies the cell within the S×R set of cells.

Figure 9:
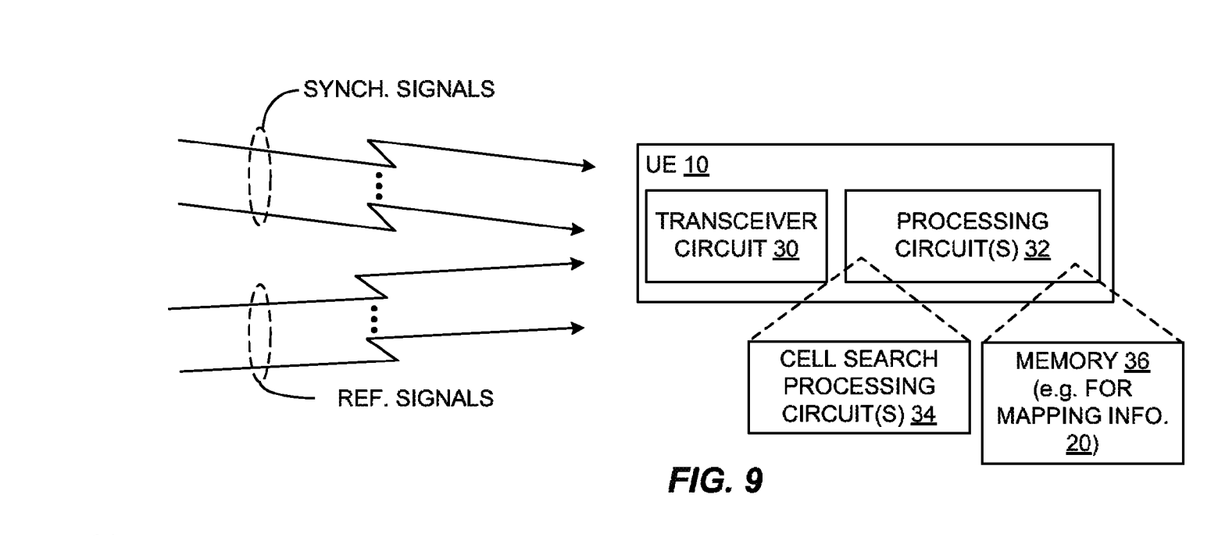
FIG. 9 is a block diagram of one embodiment of a UE.

Regardless of the particular mapping implementation, however, FIG. 9 illustrates an embodiment of the UE 10, and provides an example circuit arrangement for the UE 10. It should be understood that the particular circuit arrangement adopted for the UE 10 will vary as a function of its intended use and a range of design choices. By way of non-limiting examples, the UE 10 may comprise a cellular radiotelephone or other type of mobile station or handset, a Portable Digital Assistant (PDA), a wireless pager, a wireless network card or other communication module, a laptop/palmtop computer, etc.

As for FIG. 9, the illustrated UE 10 comprises a transceiver circuit 30 and operatively associated processing circuits 32, which include one or more processing circuits denoted as cell search processing circuits 34, and further includes memory 36. The processing circuits 32 may comprise one or more baseband processors and supporting circuitry, and may be implemented as one or more ASICs, microprocessors, DSPs, etc. The memory 36 may comprise one or more devices and may include different types of memory, e.g., RAM and NV-RAM or ROM, FLASH, etc. In any case, some version of the previously illustrated data structure 20 may be held in the memory 36 as stored mapping information for use by the cell search processing circuits 34.

In more detail, the UE 10 receives synchronization signals and reference signals from the network 12. Although circumstances change dynamically as a function of the UE's changing location and local fading conditions, the UE 10 generally receives multiple synchronization and reference signals from multiple cells 14, and part of the cell search process involves detecting or otherwise recognizing the best synchronization signal(s), and determining corresponding cell identifiers for the cell or cells originating the best synchronization signal. In this context, "best" denotes the strongest such received signal, which may be evaluated by comparing correlation peak responses among the different received synchronization signals.

For example, in at least one embodiment, the network 12 comprises a Third Generation (3G) Long Term Evolution (LTE) network, wherein the synchronization signals of interest (with regard to the mapping process) comprise Primary Synchronization Channel (P-SyS) signals and the reference signals comprise Downlink (DL) reference symbols.

In more detail, as explained earlier herein, an LTE embodiment of the network 12 transmits P-SyS signals and Secondary Synchronization Channel (S-SyS) signals from each cell 14. Further, each cell 14 transmits a unique sequence of DL reference symbols as the identifying reference signal for the cell 14. Thus, the UE 10 potentially receives multiple P-SyS, S-SyS, and reference signals at any one time.

Figure 10:
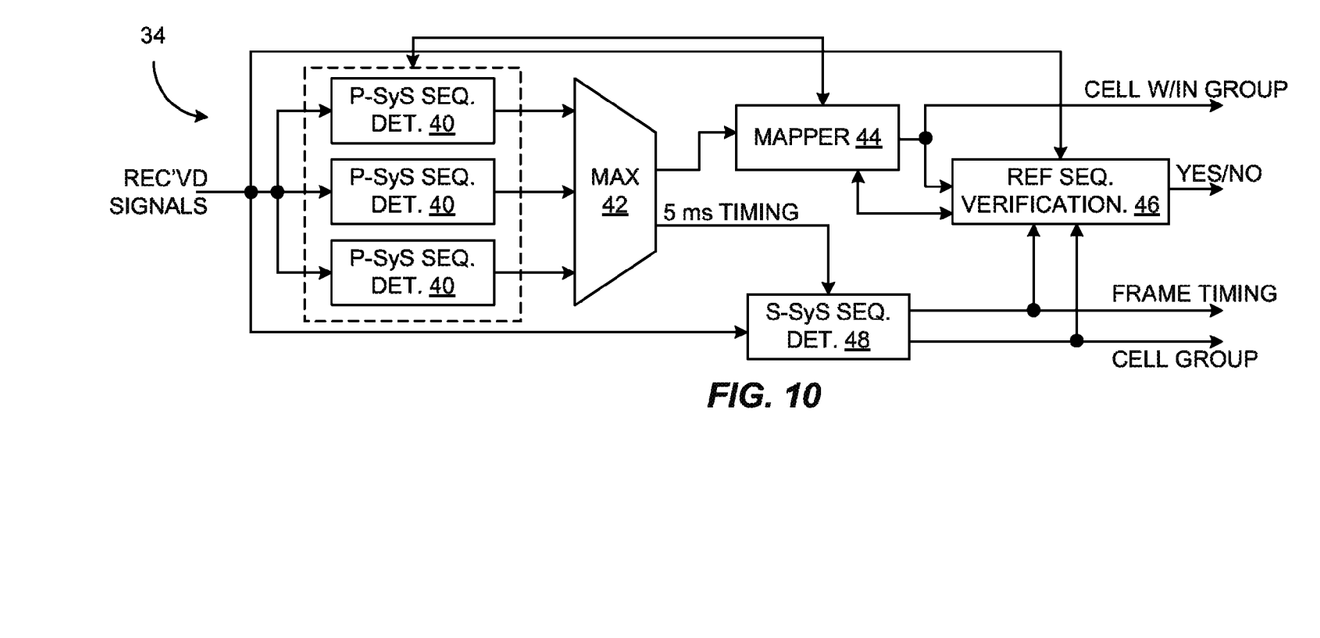
FIG. 10 is a block diagram of one embodiment of cell search processing circuits implemented within a UE.

FIG. 10 illustrates example circuit details for the cell search processing circuit(s) 34. Note that the received signals (REC'VD SIGNALS) shown in the diagram comprise digitized signal streams derived by the transceiver circuits 30 from incoming antenna-received signals. Also, it should be understood that the illustrated architecture is subject to variation, particularly given the possible design choices associated with implementing receiver-oriented digital signal processing.

In any case, the illustrated embodiment of the cell search processing circuits 34 comprise P-SyS sequence detectors 40 (three are illustrated). The detectors 40 may be used for concurrent reception of multiple P-SyS signals. In turn, the maximum response detection circuit 42 compares the detection responses—sequence correlation peaks—output by the detectors 40 for the multiple P-SyS signals and identifies the best (strongest) one of them. A mapping circuit 44 (having access to the stored mapping information) then determines the corresponding cell identifier based on the P-SyS sequence selected by the maximum response circuit 42 and knowledge of the stored mapping information.

In embodiments where a one-to-one mapping is used between P-SyS sequences and reference symbol sequences, identifying the best-received P-SyS sequence identifies the cell 14 originating that P-SyS sequence. However, at least one embodiment of the UE 10 is configured to verify that determination of cell identifier. To that end, the cell search processing circuits 34 may include a reference signal sequence verification circuit 46, which detects the actual reference signal sequence for the reference signal received in association with the P-SyS signal identified by the maximum response detection circuit 42. The verification circuit 46 may be configured to provide a Yes/No response indicator, and the UE 10 may be configured to use the detected reference signal sequence as the basis for cell identification if the reference signal sequence obtained from the mapper 44 does not match the detected reference signal sequence.

Note, too, that the illustrated circuits include an S-SyS sequence detector 48, which provides for full cell synchronization—i.e., the S-SyS signals allow the UE 10 to detect the transmission timing (frame boundaries) of individual cells 14. S-SyS detection also provides for cell group identification. Such information may be used by the verification circuit 46 and by other processing circuits in the UE 10. In particular, the mapper 44, the verification circuit 46 and the S-SyS detection circuit 48 may cooperate together to determine cell identifiers particularly in embodiments where more than one P-SyS sequence maps to the same reference signal sequence, and it is necessary for the cell search processing circuits 34 to detect and compare a subset of reference signal sequences for cell identifier determination. On that point, it should be understood that the cell search processing circuits 34 and/or the processing circuits 32 at large include channel estimation circuits, etc., to provide for accurate detection of reference signal sequences from received reference signals as needed.

Of course, whether the UE 10 uses actually detected reference signal sequences, or relies on detection of synchronization signal sequences and the synchronization-to-reference signal mapping, or a combination thereof, depends on whether one-to-one mapping is used, and on design/performance preferences. Indeed, that flexibility represents just one aspect of variation for the foregoing embodiments, and it should be understood that the foregoing description and the accompanying drawings represent non-limiting examples of the methods and apparatus taught herein for carrying out a cell searching method wherein the method is enhanced by linking synchronization signal sequences to reference signal sequences according to a known mapping. As such, the present invention is not limited by the foregoing description and accompanying drawings. Instead, the present invention is limited only by the following claims and their legal equivalents.

What is claimed is:

1. A method in a wireless communication network of facilitating cell search processes by user equipment needing to synchronize with cells in said wireless communication network, the method comprising:

maintaining a set of synchronization signal sequences to be used for generating individual synchronization signals, the set of synchronization signal sequences comprising a plurality of synchronization signal sequences;

maintaining a set of reference signal sequences to be used for generating individual reference signals, the set of reference signal sequences comprising a plurality of reference signal sequences;

linking each of the synchronization signal sequences to one or more of the reference signal sequences according to a defined mapping to thereby enable user equipment to determine cell identities based on mapping detected synchronization signal sequences to corresponding reference signal sequences according to the defined mapping;

generating individual ones of the synchronization and reference signals at each of one or more base stations in the wireless communication network, in accordance with said defined mapping; and transmitting the generated synchronization and reference signals from respective ones of the one or more base stations, to allow user equipment to synchronize with cells associated with the one or more base stations, and to determine cell identities for those cells based on mapping synchronization signal sequences to reference signal sequences according to said defined mapping;

wherein maintaining a set of synchronization signal sequences to be used for generating individual ones of the synchronization signals comprises maintaining as many synchronization signal sequences as reference signal sequences; and wherein linking each of the synchronization signal sequences to one or more of the reference signal sequences according to a defined mapping comprises adopting a one-to-one mapping between synchronization signal sequences and reference signal sequences.

2. The method of claim 1, wherein the wireless communication network comprises a Third Generation (3G) Long Term Evolution (LTE) network, the synchronization signals comprise Primary Synchronization Signals (P-SySs), and the reference signals comprises Downlink (DL) reference symbols.

3. The method of claim 2, wherein the synchronization signals further comprise Secondary Synchronization Signals (S-SySs), each cell in the network transmitting a P-SyS and an S-SyS, and wherein linking the synchronization signal sequences to the reference signal sequences according to a defined mapping comprises linking unique combinations of P-SySs and S-SySs to one or more individual reference signal sequences.

4. A method of cell searching by a user equipment operating in a wireless communication network that transmits synchronization signals to allow user equipment to synchronize with cells and transmits reference signals to allow user equipment to detect cell identities, the method comprising:

storing mapping information for a set of synchronization signal sequences comprising a plurality of synchronization signal sequences, and a set of reference signal sequences comprising a plurality of reference signal sequences, wherein the stored mapping information defines a one-to-one mapping between the synchronization signal sequences and the reference signal sequences;

detecting the synchronization signal sequence of a received synchronization signal; and determining a cell identifier for a cell associated with the received synchronization signal by using the stored mapping information to identify the one reference signal sequence that corresponds to the detected synchronization signal sequence.

5. The method of claim 4, further comprising confirming the cell identifier by detecting a reference signal sequence of the cell and comparing the detected reference signal sequence with the reference signal sequence determined from the stored mapping information.

6. The method of claim 4, wherein detecting the synchronization signal sequence of a received synchronization signal includes concurrently receiving synchronization signals from two or more cells, and wherein determining the cell identifier comprises determining the cell identifier for a strongest one of the two or more received synchronization signals.

7. The method of claim 4, wherein detecting the synchronization signal sequence of a received synchronization signal includes concurrently receiving synchronization signals from two or more cells, and wherein determining the cell identifier comprises determining the cell identifiers for selected ones of the two or more received synchronization signals to identify handoff candidates.

8. A user equipment comprising:

a receiver circuit for receiving a synchronization signal from a cell of a supporting wireless communication network;

a memory for storing mapping information for a set of synchronization signal sequences comprising a plurality of synchronization signal sequences, and a set of reference signal sequences comprising a plurality of reference signal sequences, wherein the stored mapping information links each of the synchronization signal sequences to one or more of the reference signal sequences that correspond to cell identifiers for cells in the network; and one or more processing circuits configured to detect a synchronization signal sequence of the received synchronization signal and determine a cell identifier for the cell based on mapping the detected synchronization signal sequence to a reference signal sequence according to the stored mapping information;

wherein the stored mapping information defines a one-to-one mapping between the synchronization signal sequences and the reference signal sequences, and wherein the one or more processing circuits are configured to determine the cell identifier by using the stored mapping information to identify the one reference signal sequence that corresponds to the detected synchronization signal sequence.

9. The user equipment of claim 8, wherein the one or more processing circuits are configured to confirm the cell identifier by detecting a reference signal sequence of the cell and comparing the detected reference signal sequence with the reference signal sequence determined from the stored mapping information.

10. The user equipment of claim 8, wherein the user equipment concurrently receives synchronization signals from two or more cells, and wherein the one or more processing circuits are configured to determine the cell identifier by determining the cell identifier for a strongest one of the two or more received synchronization signals.

11. The user equipment of claim 8, wherein the user equipment concurrently receives synchronization signals from two or more cells, and wherein the one or more processing circuits are configured to determine the cell identifiers for selected ones of the received synchronization signals, to identify handoff candidates for the user equipment.

\* \* \* \* \*